United States Patent [19]

Dean et al.

[11] Patent Number: 5,311,977
[45] Date of Patent: May 17, 1994

[54] HIGH RESOLUTION PARTS HANDLING SYSTEM

[76] Inventors: Arthur L. Dean, 2750 Rebecca Dr., Indiana, Pa. 15701; Randy K. Baird, R.D. #1, Box 232, Bolivar, Pa. 15923; Stanley P. Turcheck, Jr., R.D. #3, Box 1105, Homer City, Pa. 15748; James P. Martin, R.D. #4, Box 141B, Blairsville, Pa. 15717

[21] Appl. No.: 46,888

[22] Filed: Apr. 12, 1993

Related U.S. Application Data

[63] Continuation of Ser. No. 587,448, Sep. 25, 1990, abandoned.

[51] Int. Cl.$^5$ ............................................... B65G 47/24
[52] U.S. Cl. ................................... 198/395; 198/391; 250/223 R; 356/375; 356/376; 356/394
[58] Field of Search ........................ 209/509, 540–542, 209/545, 552, 576, 577, 586, 598; 198/391, 392, 395, 398, 399; 356/375, 376, 394; 250/222.1, 223 R, 224

[56] References Cited

U.S. PATENT DOCUMENTS

| | | | |
|---|---|---|---|
| 4,576,482 | 3/1986 | Pryor | 209/586 X |
| 4,608,646 | 8/1986 | Goodrich et al. | 209/598 X |
| 4,630,225 | 12/1986 | Hisano | 356/394 X |
| 4,655,350 | 4/1987 | Mojden et al. | 198/398 |
| 4,765,484 | 8/1988 | Klumparendt | 209/577 |
| 4,784,493 | 11/1988 | Turcheck, Jr. et al. | 209/577 X |

FOREIGN PATENT DOCUMENTS

| | | | |
|---|---|---|---|
| 0265650 | 5/1988 | European Pat. Off. | 209/586 |
| 3312983 | 10/1984 | Fed. Rep. of Germany | 209/598 |
| 0235574 | 5/1986 | Fed. Rep. of Germany | 209/598 |
| 1300518 | 3/1987 | U.S.S.R. | 209/577 |

*Primary Examiner*—Joseph E. Valenza
*Attorney, Agent, or Firm*—Douglas W. Rudy; Richard B. Megley

[57] ABSTRACT

A high resolution article handling system serves as an article discriminator or identifier by creating an object silhouette. The objects are singulated on a conveyor and scanned by a linear array of CCD units (2048 pixels per inch) at a scan rate of 10 MHz. Pixel transitions corresponding to object edge points are converted to a single count value from a counter which is synchronized with the scanner. A microprocessor with a first in, first out buffer memory needs only a capacity to handle the count value rather than all data from the pixels. Article orientation is corrected in response to signal generated by determining the count value difference between a reference value and a work article value at only the scan slice windows at equally spaced positions along the article length where differences have been predetermined to be a maximum.

2 Claims, 10 Drawing Sheets

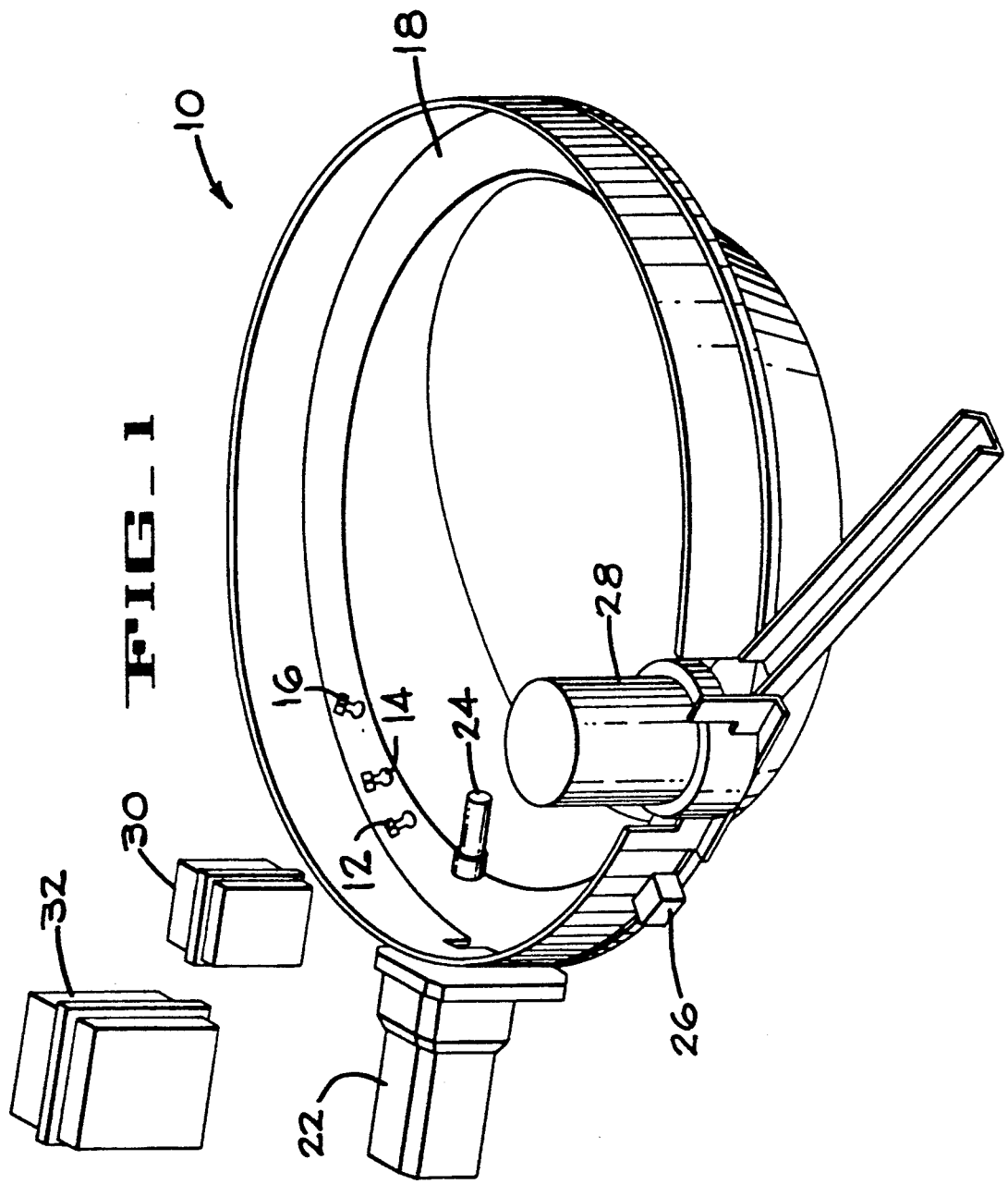
FIG_1

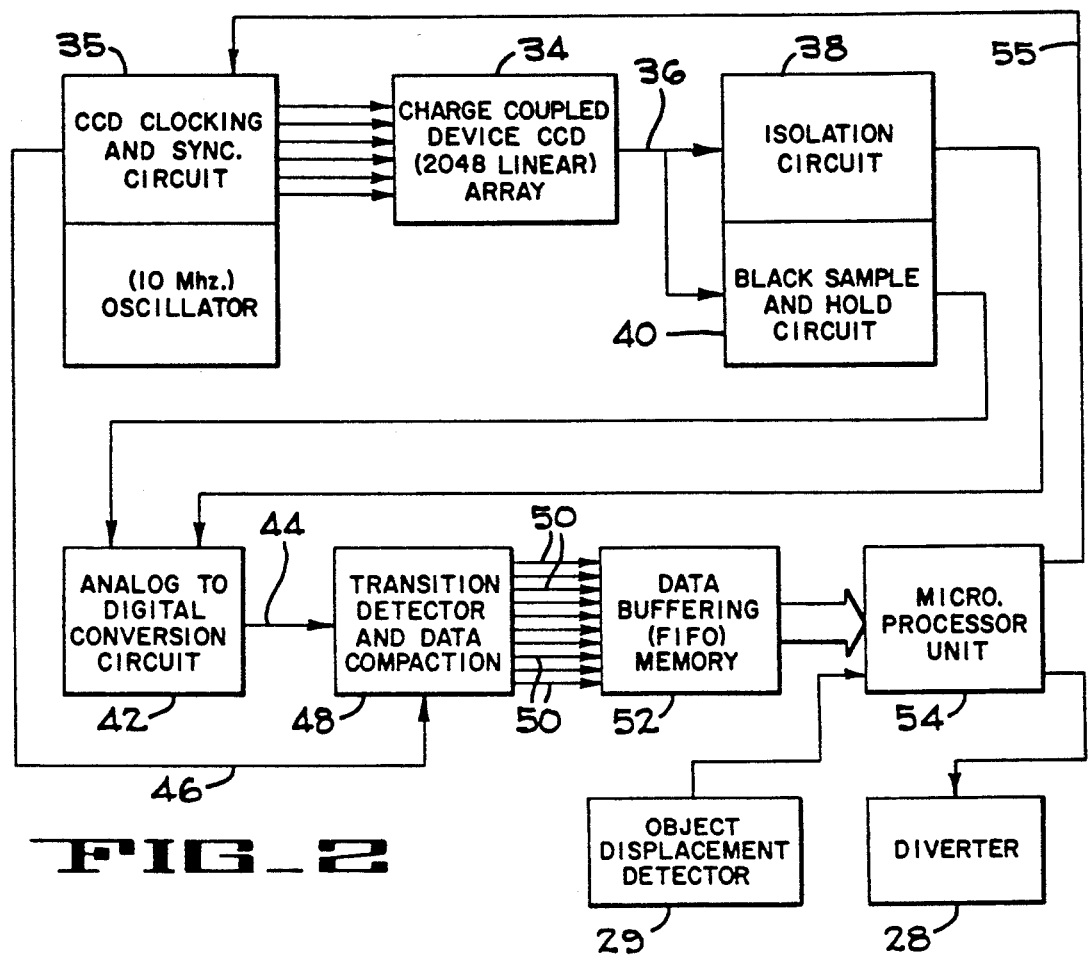
FIG_2
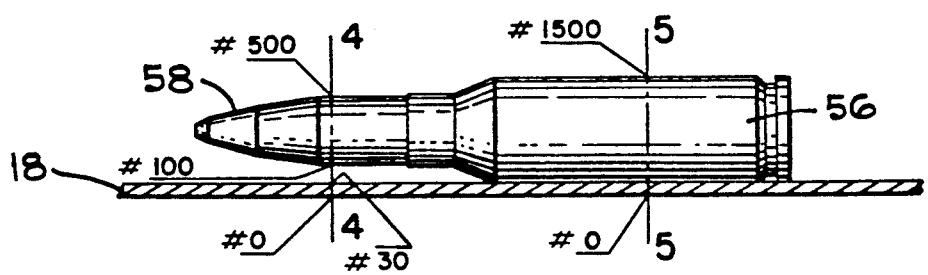
FIG_3

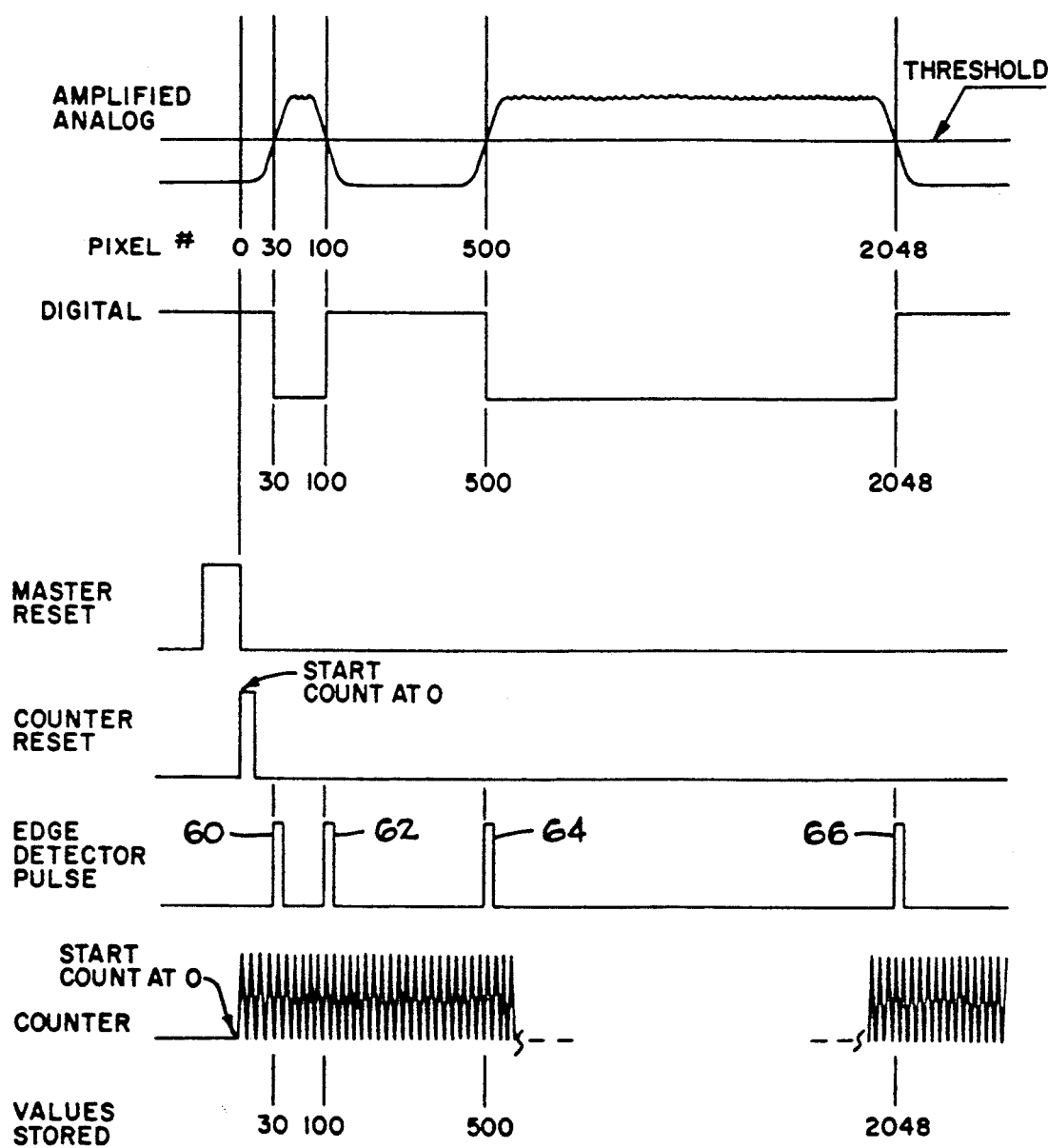

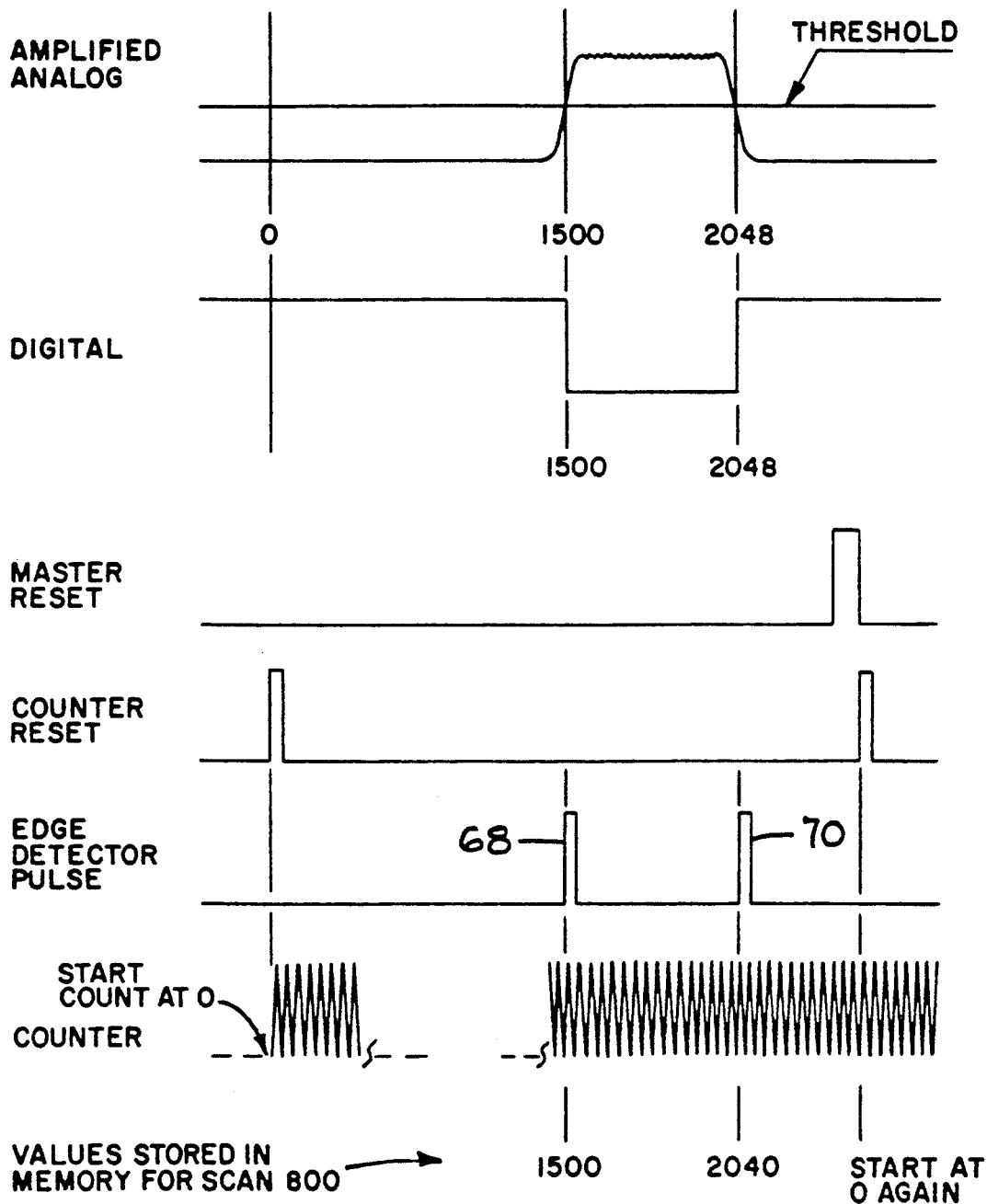

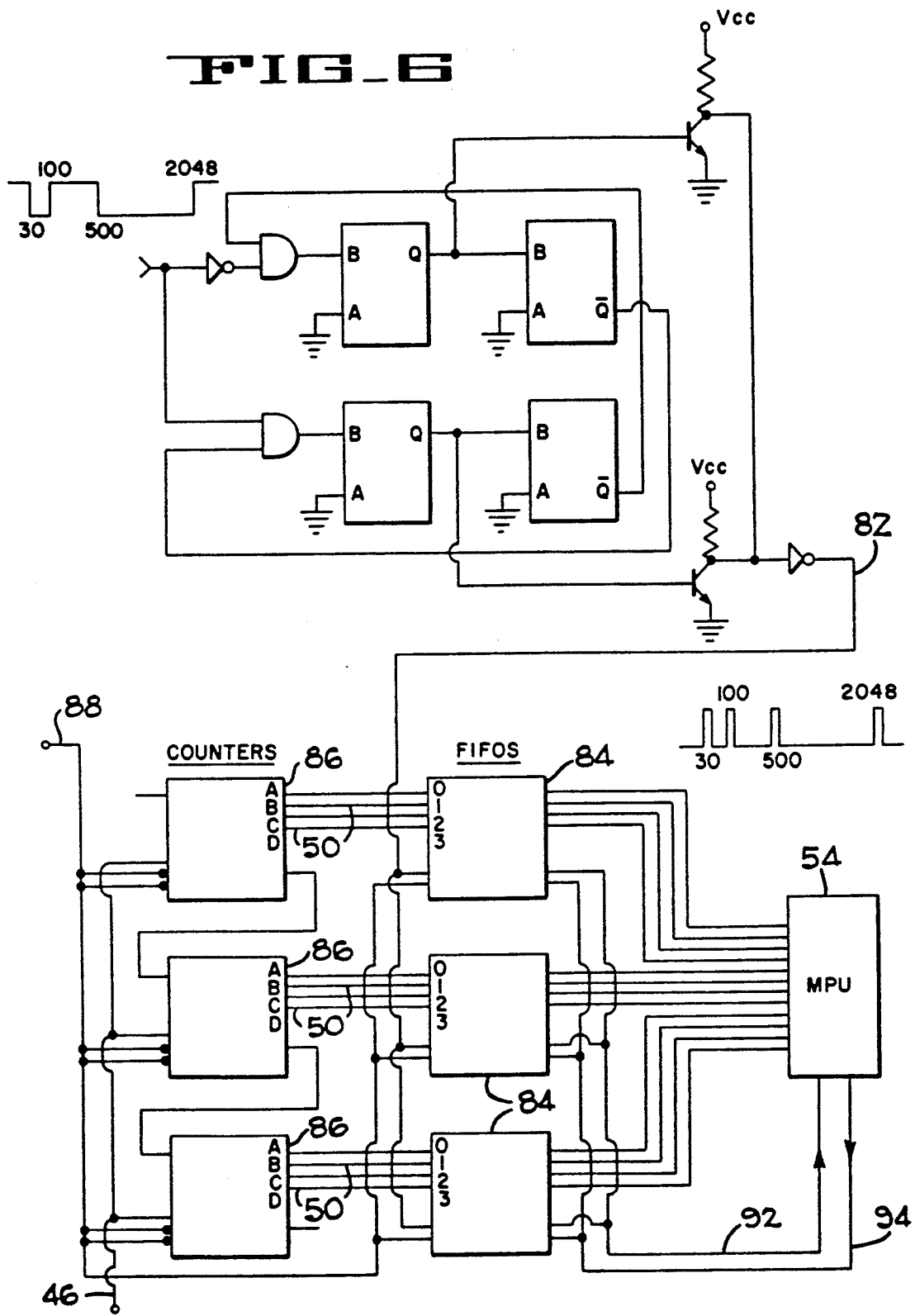
FIG_6

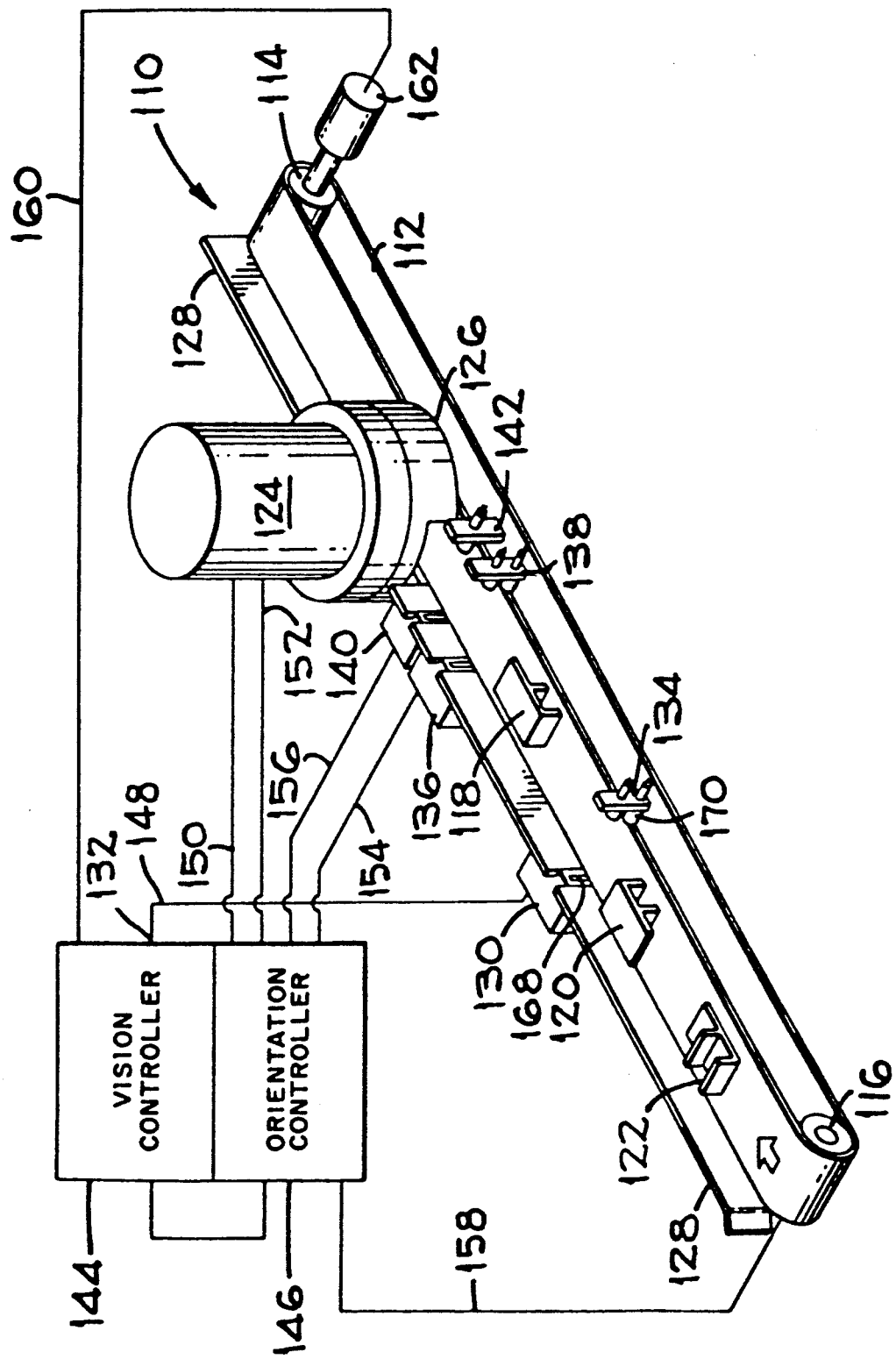

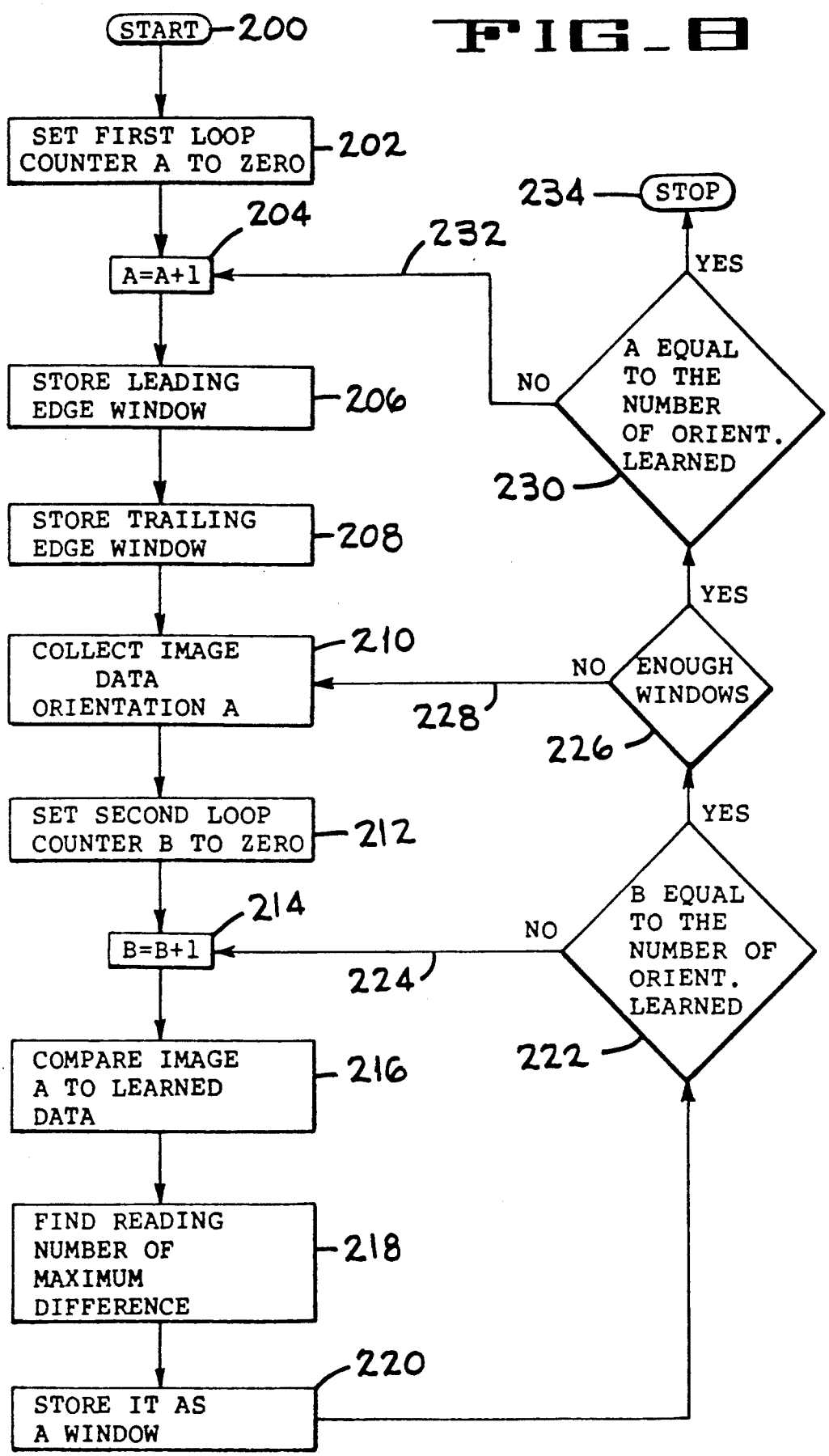
FIG_8

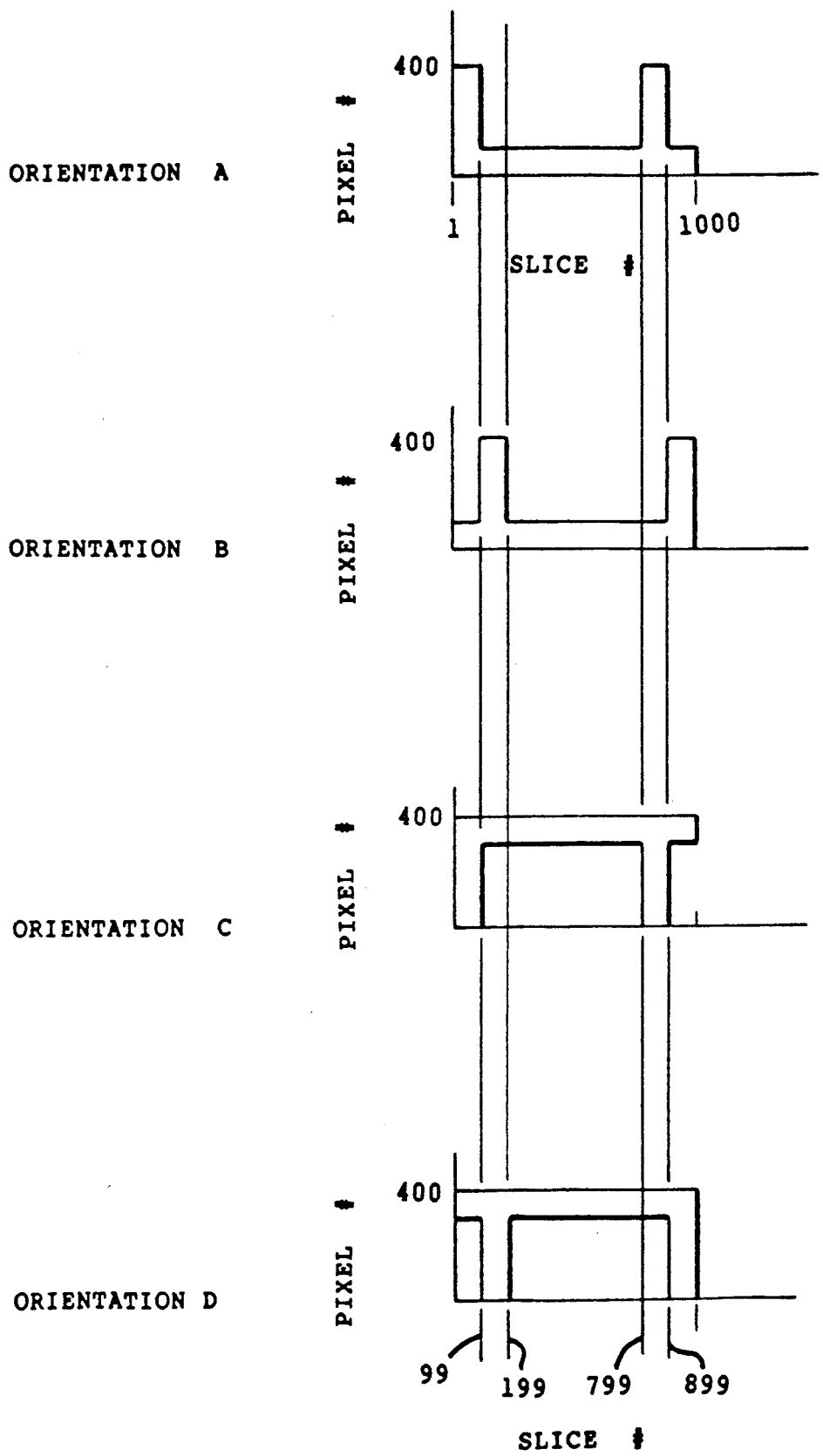
FIG_9

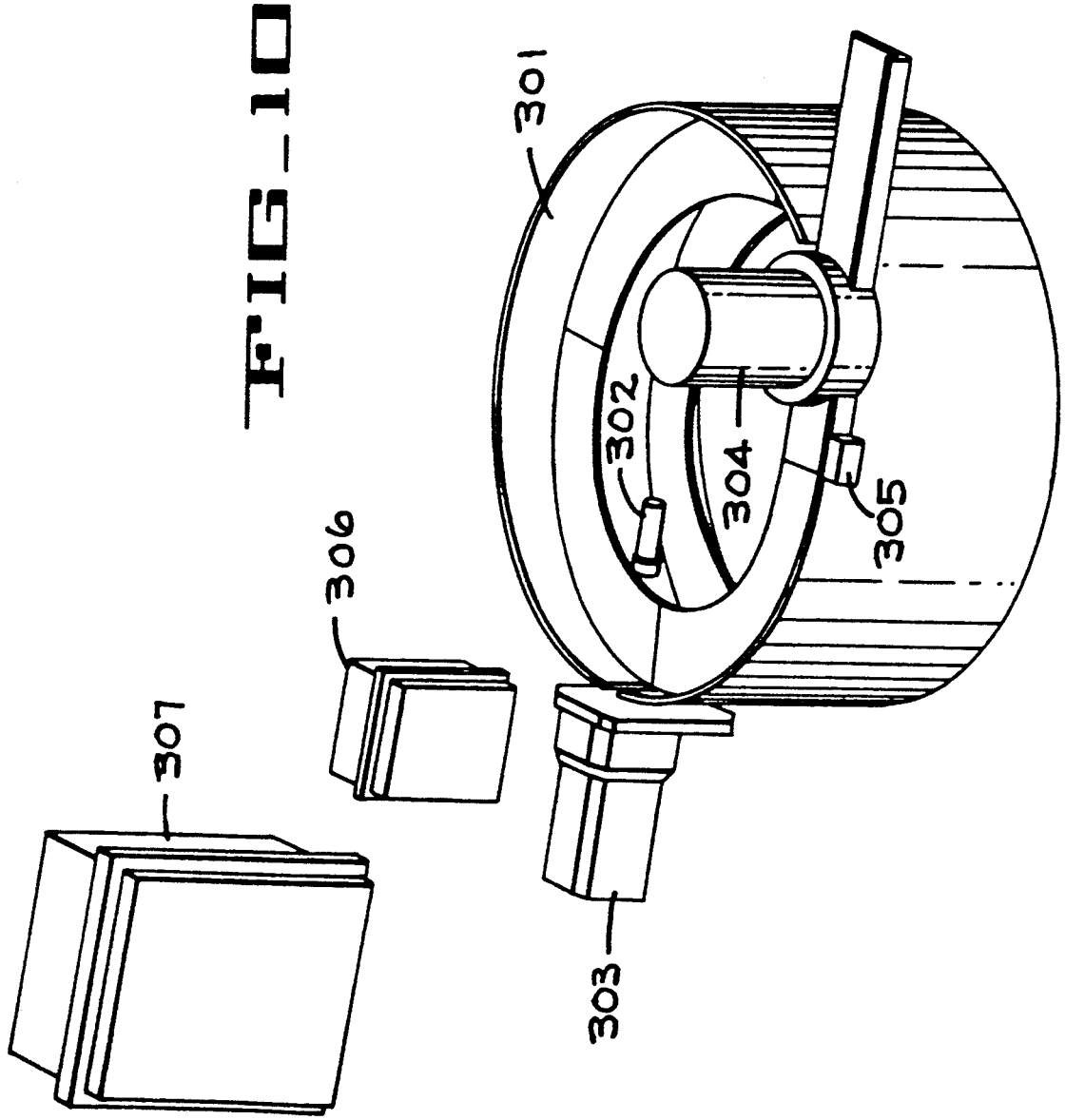
FIG_10

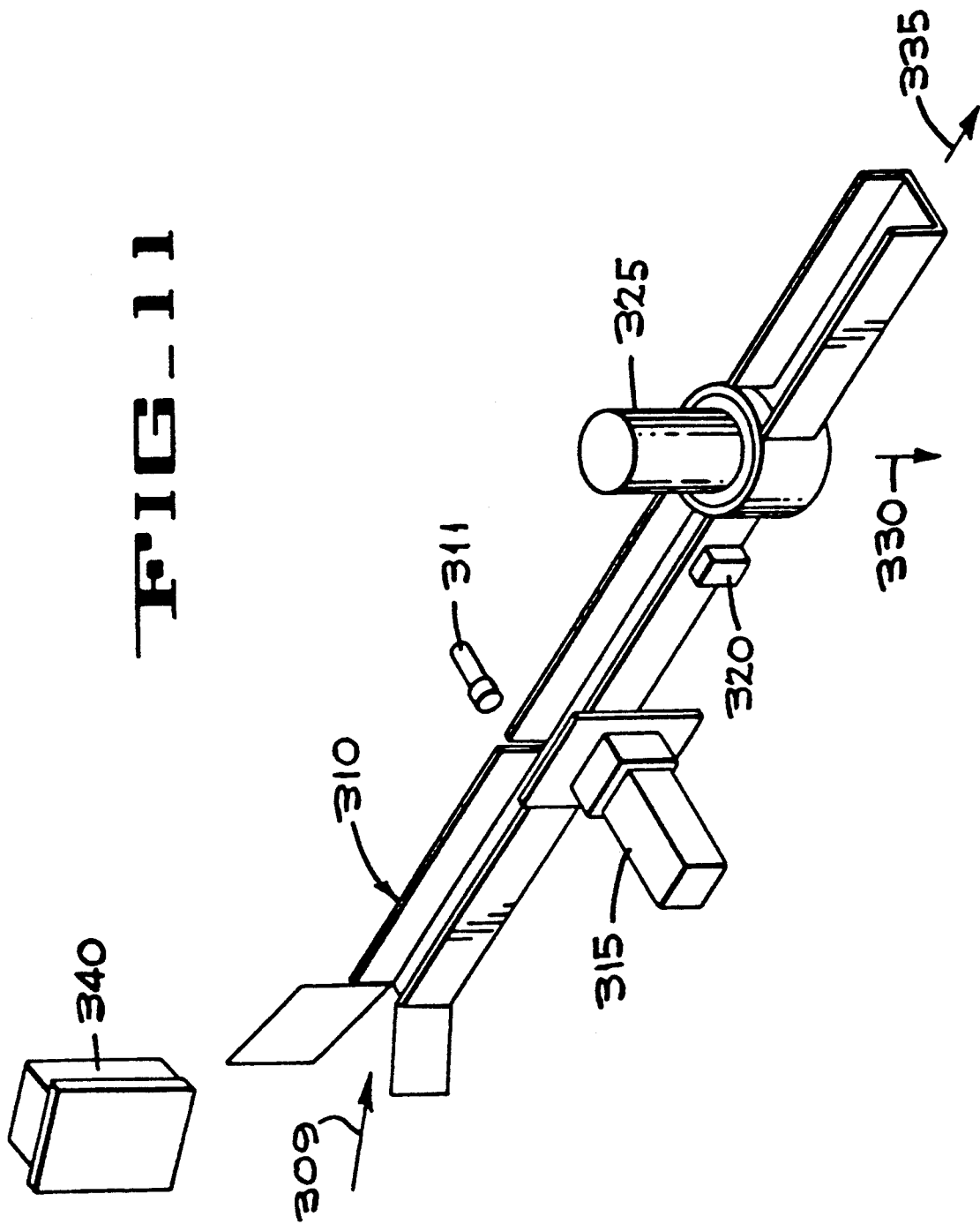
FIG_11

5,311,977

HIGH RESOLUTION PARTS HANDLING SYSTEM

This application is a continuation of application Ser. No. 07/587,448, field Sep. 25, 1990 now abandoned.

This invention relates to the determination of article orientation in an article handling system, and more particularly to a high resolution article handling system where article movement along a conveyor may be several inches per second.

BACKGROUND

In Turcheck et al U.S. Pat. No. 4,784,493 an apparatus and method are disclosed for recognition of an article and its orientation on a conveyor. To determine orientation of a work article, a number of possible orientations are recorded in a memory. The data stored in the memory for each orientation is compared with scanned data from a work article. Orientation of the work article is determined by matching of the compared data.

To enhance resolution, more data points are required which has traditionally meant more expensive processing both for memory size and processing time. The time required for making such article orientation determination restricts the number of articles that can be processed in a unit of time.

SUMMARY OF INVENTION

It is a major object of the present invention to reduce the processing time for determining article orientation by use of just a portion of high resolution data concerning the object. On each vertical scan of a horizontal moving article, a determination of the edge point on the profile may be imaged by a linear array of CCD units that provide at least several hundred pixels per inch. This pixel information is reduced to a count value for each edge point on the article profile of a vertical scan slice. The count value is processed rather than all of the information available from the various pixels.

A further feature of the present invention resides in the use of selected scan slices at critical locations along the length of the article to determine article orientation. By comparing count values at only about two percent of the possible scan slices, a great reduction is made in the amount of memory required and the time for data processing.

As a still further feature, fewer than all of the high resolution data points for each vertical scan slice are automatically selected based on article geometry. The automatic selection is based on maximum differences between different orientations and conducted during a setting-up procedure. The memory size of the microprocessor and the time required for processing the selected data is significantly reduced.

These and other advantages will become more fully apparent from the claims and from the description as it proceeds in connection with the appended drawings.

BRIEF DESCRIPTION OF DRAWINGS

FIG. 1 is a diagrammatic view of a first conveyor system for separating and orienting parts, together with a novel inspection camera and information processor;

FIG. 2 is a block diagram of a camera sensor and related functional circuitry for acquiring and storing object silhouette information;

FIG. 3 is an elevation of a conveyor moving surface that is supporting a round of ammunition;

FIG. 4 is a group of waveforms taken at scan position 120 as depicted by line 4—4 of FIG. 3;

FIG. 5 is a group of waveforms taken at scan position 800 as depicted by line 5—5 of FIG. 3; and FIG. 6 is a diagram of a suitable circuit arrangement for hardware that can compact the object image intelligence data.

FIG. 7 is a pictorial view of a second conveyor system having an article diverter, together with the novel inspection camera, information processor and system for determining scan slice windows;

FIG. 8 is a flow diagram of a procedure for automatically generating scan slice windows at only a few locations along the object or article length that are sufficient to enable identification of orientation;

FIG. 9 are elevation views of four possible orientations of the object whose orientation is to be identified;

FIG. 10 is a pictorial view of a vibrating bowl conveyor system adapted for use with the high resolution article handling system; and FIG. 11 is a pictorial view of a gravity chute conveyor which is adapted for use with the high resolution article handling system.

DETAILED DESCRIPTION OF PREFERRED EMBODIMENTS

The present invention is adapted for use with conveyors that move a series of like objects on a repetitive basis for automated inspection or assembly. The invention serves as a substitute for human inspection of the object orientation on the conveyor surface and is adapted to provide data representation concerning a part size that may have a high resolution as little as 0.0005 inches.

In the illustrated conveyor 10 of FIG. 1, objects 12, 14, 16 rest on a surface 18 that moves in a counterclockwise direction while a tilted central disk rotates at a slower speed to load objects in spaced positions along conveyor surface 18 in a known manner. The objects 12, 14, 16 that have been singulated pass between a camera sensor 22 and a light source 24 after which they move downstream to a conventional detector 26 and diverter 28 which enables reorientation and/or rejection of improperly oriented or sized articles. The diverter may be of the general type including that disclosed in Dean et al U.S. Pat. No. 4,619,356.

In accord with one feature of the present invention, a camera sensor 22 is not a raster scan type, but instead consists of a linear array of charge coupled device (CCD) units. The CCD units are aligned to be transverse to the direction of object movement. The linear array of CCD units thus may be essentially vertical in the case of a horizontal conveyor The CCD units are aligned in a single column that is one pixel wide and at least about 1000 pixels high. The height of the CCD unit column must be sufficient to span the feature of interest of the object 12, 14, 16 on the conveyor 18. For many small objects such as bolts, screwdriver handles, small caliber ammunition and the like, a maximum variation of the feature of interest may be within a one-inch span A silhouette image data obtained for certain applications must have a 0.0025 inch resolution. The number of CCD units in the one-inch column may conveniently be about 2000 and advantageously may be 2048. An even smaller resolution of about 0.0005 inches may be obtained with the use of about 3000 or 4000 pixels in a one inch column. The linear array of CCD units may be obtained commercially from Texas Instruments as TC-103-1. The drive circuitry necessary for proper CCD operation and timing diagrams to provide a sequential scan of the analog voltage signal are commercially available. The scan rate must provide sufficient time to transfer each pixel charge fully and not allow any charge to accumulate in a pixel between reset and the next scan at which time a momentary voltage is applied to each of the CCD sensing units. For 2048 CCD unit array, we have found that a scan can be effected in about 330 microseconds and that time periods between successive scans can be variable and up to about 7 inches per second while maintaining a resolution of 0.0025 inches.

In the system of the present invention, the light source 24 is located across the conveyor surface 18 to face the CCD units. As an object 12, 14, 16 passes between the light source 24 and the camera sensor 22, a shadow is formed on certain of the pixel areas whereas unblocked pixels are fully illuminated by the light. By use of a collimated light source which operates through a lens having a shape and size corresponding to that of the linear array of CCD units forming a camera sensor, a precise point on the upper edge surface of the object can be optically determined with great accuracy. Variations in ambient light conditions are less likely to interfere with operation of the camera sensor when a collimated light source is used.

If the object has a point on the lower edge surface that is positioned above the conveyor surface, a light beam will be detected at appropriately positioned pixels in the same linear array at a point on the lower surface which is opposite the detected point on the upper object surface. Similarly, an aperture in the object which is aligned between the collimated light source 24 and the camera sensor 22 will produce transitions in the adjacent pixels to provide a manifestation of the marginal edge points of the aperture at successive positions as the object advances past the camera sensor.

Successive exposures of the camera sensor 22 to each object 12, 14 or 16 as it moves along the conveyor path 18 gives 5 successive data inputs which may be sequentially processed and collectively used to provide as a display, a silhouette of the object before the object reaches the diverter station 28. Object speed on the conveyor may be monitored and signals generated corresponding to object or article displacement along the conveyor path to allow article shape "learning" procedures to be carried out at a speed that is different from the operating speed. Successive scans may be provided at intervals as short as 300 microseconds with a 2048 pixel linear array driven by a 10 MHz clock. Conveyor speeds up to seven inches per second may be acceptable without exceeding the resolution accuracy specified and may be monitored by a shaft position resolver which produces a digital input signal that can be used by the microprocessor as an object displacement detector 29 as shown in FIG. 2.

The installation as illustrated in FIG. 1 may include also a system control 30 and control box 32 which are usually physically located near the conveyor and may be in a single housing.

With reference to FIG. 2, a functional block diagram of the camera sensor 22 is illustrated. The vertical column of CCD units 34, consisting of a 2048 pixel linear array in the illustrated embodiment, is connected to receive clocking or timing signals from the clock and sync circuit 35. Clock circuit 35 includes an oscillator running at a frequency of at least about one MHz, and 10 MHz in the illustrated example, in order to provide pixel scanning in about 200 microseconds and 100 microseconds or more for reset operation. The CCD units that are commercially available are capable of running at clock frequencies as high as 40 MHz. Thus, pixel scan during about a 300 microsecond sampling scan after conditioning, is used to produce an analog information signal which contains a transition relating to the precise position of an edge point on an object or part which is being conveyed. To allow for variations in conveyor speeds, the actual start of each vertical slice scan follows receipt of a master reset pulse (FIGS. 4 and 5) from microprocessor unit 54 on lead 55 shown in FIG. 2.

From the column of CCD units 34 which each functions as a pixel, an output signal on lead 36 is in the form of an analog signal voltage (see FIGS. 4 and 5) containing sequentially obtained voltages of a first amplitude for shadowed pixels and a second low amplitude for those pixels receiving light from light source 24. The analog information is a serial bit stream of uniform length and is transferred serially at the clock rate to a voltage follower that serves as an isolation circuit 38 and to a black sample and hold circuit 40 which produces a voltage level reference signal from pixels that are blocked from receiving light. This provides a reference signal which holds the analog signal at a controlled DC level and may be used as one input to circuitry associated with an analog to digital conversion circuit 42.

The output signal on lead 44 is applied to terminal 80 of the transition detector and data compaction circuitry 48 which will be described in connection with FIG. 6. On lead 46, a clock signal from the clocking and sync circuit 35 is applied to maintain synchronization between the data compaction unit 48 and the scanning means that is part of the charge coupled device array 34.

The output signals from the data compaction device 48 on leads such as those shown as 50 for example is in the form of a single binary number for each transition from the analog to digital conversion circuit and is applied to the memory 52 which serves as a buffer to collect all of the data for a particular object 12, 14 or 16 on the conveyor surface on a first in, first out basis. The microprocessor unit 54, which may be any suitable type that is commercially available, may start to process the output signals as soon as the memory 52 begins to receive valid object data.

The camera sensor 22 is thus synchronized with a counter in the data compactor 48 by means of the clocking and sync circuit 35 to provide scan slice information. The memory 52 for data buffering may have a 64K or even smaller capacity for objects of the type mentioned above. As pointed out above, low cost commercially off-shelf available components have a capability to operate up to a 10 MHz data rate in a reliable fashion thereby providing a low cost hardware product.

With reference to FIG. 3, there is illustrated a round of ammunition which has a cylindrical cartridge or casing 56 that is supported on a conveyor surface 18 and a projectile 58. FIG. 4 contains a group of waveforms taken along line 4—4 of FIG. 3 and FIG. 5 contains a group of similar waveforms taken along line 5—5 of FIG. 3. FIG. 4 waveforms are taken at a position corresponding to scan slice window 120 whereas, the FIG. 5 waveforms are taken at scan slice window 800.

In FIG. 4, the waveform of the amplified analog signal starts at time 0 in a black condition because of the conveyor 18. At pixel 30, which corresponds to count 30 in a counter, light is detected thereby starting a negative going digital pulse and a positive going edge detector pulse 60. At pixel 100, the lower edge point on the silhouette of the projectile 58 is effective to block light and create a further edge detector pulse 62. At pixel 500, the light is again detected, thereby causing a third edge detector signal 64 to be generated. Finally, at the top pixel 2048 of the linear array, the scanner no longer produces a signal and an end of scan transition detector pulse 66 is generated.

A conventional binary counter capable of counting up to at least 2048 at the clock frequency is synchronized with the scan of the 2048 pixels in the camera sensor as indicated at the bottom waveform of FIG. 4. The clock is reset to start at zero as the scan starts so that count values of 30, 100, 500 and 2048 are stored in the memory 52 of FIG. 2 as determined by the time of occurrence of edge detector pulses 60, 62, 64 and 66.

FIG. 5 shows the corresponding waveforms that occur at scan 800. Since the lowest point on the cylindrical casing 56 rests on the conveyor surface 18, the lowest 1499 pixels in the linear array are dark and the first transition occurs with pixel 1500, which is aligned with the upper edge point of the cartridge casing 56 at scan slice position 800.

The edge detector pulse 68 is generated in response to the transition at pixel 1500 and causes the count value of 1500 to fall through the memory 52 to its output terminals. A similar edge detector pulse 70 occurs at count 2048. Thereafter, a master reset pulse is generated either periodically in which case a constant conveyor speed is required or by an object displacement monitor so that the same number of scan slices is produced for each identical work article. The counters are reset to a zero count by a counter reset signal which is synchronized with the beginning of the next scan of the pixels.

FIG. 6 shows one preferred embodiment for converting the digital signals of FIGS. 4 and 5 into count values that are supplied to the microprocessor unit (MPU) 54. The digital signal from FIG. 4, in the form of incoming serial binary bit, is applied to terminal 80 of a negative and positive edge detecting network that detects changes in the binary state and issues for each positive or negative edge a 50 n sec. pulse on lead 82. At a 10 MHz clock frequency, the scanned information data and clock counts are separated by 100 n sec. The 50 n sec. pulse is used to gate on the memory unit 52 (FIG. 2) which includes FIFO registers 84 as illustrated in FIG. 6. The three binary counter registers 86 that operate with clock signals on lead 46 are reset by a counter reset signal on lead 88. The count value on leads 50 is constantly presented to the FIFO registers 84. However, the count values are allowed to drop through the FIFO registers 84 only when an edge detector pulse on lead 82 is present. In this example, the count values of 30, 100, 150 and 2048 are stored.

When a count value falls through the FIFO registers 84, the FIFO issues an output ready signal to MPU 54 on lead 92. When the MPU sees an output ready signal, it issues a shift out signal on lead 94 to FIFO registers 84 which releases the count value immediately to the MPU 54. The data at this point is then coded object image intelligence. This handshaking continues throughout the entire scan cycle and sequentially throughout all scans of an object.

As is evident from the foregoing, for the scan 120, only four count values are processed and stored rather than 2048 bits of scan information. Other scans such as scan 800 may have only two count values that are processed. The number of scans for a three-inch object or article may be about 1000. This number may be decreased where less resolution in the horizontal direction is acceptable thereby further reducing the processing time. This compaction of data increases processing speed and reduces memory size requirements without sacrificing resolution of the silhouette image.

A horizontal belt type conveyor system is shown in FIG. 7 which is similar from a mechanical standpoint to the article or object recognition and orientation system disclosed in Turcheck et al U.S. Pat. No. 4,784,493, but which has been modified to incorporate the high resolution imaging system described in connection with the embodiment of FIGS. 1-6. The general environment of the reorientor is diagrammatically illustrated in FIG. 1. The reorientor system may generally comprise a frame supported continuous belt 112 entrained around a driver roll 114 and a idler roll 116. Work pieces such as 118, 120, and 122 are similar parts having three different orientations. The simplest form of reorientor is shown in this FIGURE, that being a stepping motor driven single axis (Y-axis) orientor having a lower chamber 126 that can be rotated 180 degrees. Other orientors including multiple position re-orientors are known in the art and may be advantageously used with the present invention.

Adjacent the continuous belt 112 at one edge thereof is a fence 128 running the length of the belt but having several breaks therein. On the inbound side of the re-orientor means 124 there is a first break in the fence to accommodate a recognition sensor 130 which may be a 1000×1 array of vertically stacked CCD units connected as described in connection with FIG. 2 to a vision controller or microprocessor input port 132. The linear array of sensors may comprise a column of CCD units which provide a pixel density of between about 1000 and 4000 pixels per inch and preferably about 2000 pixels per inch thereby to provide a high resolution sensor. The CCD units are scanned at a frequency between about 1 MHz and 40 MHz and preferably about 10 MHz to produce an analog signal that is digitized and converted to a count value as described in connection with FIGS. 2-6. Hardware compaction of data applied to the microprocessor allows for improved image resolution to be obtained while reducing the processing time and memory size requirements.

The second break in fence 128 is provided to accommodate a first infrared thru beam optical switch composed of a receiver 136 and a light source 138.

Immediately prior to the entry port of the orientor means 124 there may be optionally positioned at a third break in the fence 128, a second infrared thru beam optical switch means having a receiver 140 and a light source 142.

The recognition sensor communicates via a conduit line 148 with a vision controller 144 which in turn is in communication with an orientation controller 146.

Vision controller 144 is hard wired to the work article sensors 130 while the orientation controller 146 is wired to the article recognition sensors 136 and 140 and reorientor 124. A signal related to the movement of the conveyor belt is supplied by lead 158 to orientation controller 146. Control and monitoring of the belt speed may be by shaft encoder 162 which is connected by lead 160 to vision controller 144, since monitoring the belt speed is important for allowing variations in operating speeds without needing to re-learn the article profile just because of changes in conveyor speed.

The identical sample work pieces 118, 120, and 122 chosen for explanatory purposes of the specification are shown in FIGS. 7 and 9 and comprise a plastic article having a length of about 3 inches provided with a blunt end surface which may be either at the trailing end as shown at 118 in FIG. 7 to provide orientation A or at the leading end as is the case for work article 120 to provide orientation B. The work article 122 is shown with a third orientation C. Up to seven orientations may be determined by the program described below.

In operation, work articles 118, 120, and 122 moving along the path or the conveyor belt 112 may be inspected for conformity with a desired and acceptable work piece. In conjunction with such inspection, it is necessary to identify article orientation and make such position changes as are necessary so that all work articles leave the discharge side of the reorientor 124 with the same orientation.

Memory resident in the programmable vision controller 144 is "taught" a plurality of up to seven possible orientations of a work article in a setting procedure prior to the production run. One feature of the present invention is especially adapted for reducing the time required for making the determination of the actual orientation of work pieces, or article identification as the case may be.

As explained in the '493 patent, the capacity for data storage in the division controller 144 is sufficient to store information concerning the edge points of an article as it passes scanner 130. The recognition device operates in a silhouette mode so that only profile information data is needed. Each scan represents a slice of the article and produces at least one edge point on the profile. The number of slices per article, for example, may be 1000 depending upon conveyor speed, article length and microprocessor programming.

To operate in accordance with the present invention, an article having acceptable dimensions is fed by the conveyor past the array 130 in a first orientation A. This information is stored in a "learn" mode. Typically this procedure is repeated at least once and optionally up to about ten (10) times to obtain an envelope of values or average value for the first orientation.

Next the system is taught to recognize a second orientation B of the same article by the same procedure.

Additional orientations C, D . . . of the same article up to a total of seven (7) different orientations can be processed by the system of the prior '493 patent. When all of the required orientations are taught, i.e. stored in vision controller memory 144, the system is advanced from the "learn" mode to a "windows generation" mode before moving on to an "operation" mode allowing the repetitive feeding of work articles. Since the conveyor belt speed is carefully controlled, once the article leading edge has been detected, information data for corresponding points that are acquired by successive slice scanning can be identified by slices numbered between one and 1000 in the illustrated example. The edge point data are compared to determine which of the orientation data matches the work article data.

Since the time required for processing the edge point data information has been a factor limiting the speed at which the conveyor 112 may operate, various efforts have been made in the past to reduce the processing time to allow faster classification of objects by the computer. One previous approach has been to have the operator manually set areas of interest with a keyboard, a mouse, or the like. By this feature of the present invention, the computer automatically locates the areas of maximum difference between the stored object information data and the collective article information data without the need for operator participation.

Reference is made to FIG. 8 which shows a flow chart for generating the windows that correspond to numbered slice scans for a specific article whose orientation is to be determined.

The procedure illustrated in FIG. 8 will be described in connection with an article that may have four orientations that must be separately ascertained. The program is capable of detecting up to seven orientations as described above. The four orientations A, B, C, and D are shown in FIG. 9. Before starting the program, the orientations are stored just as described in the prior '493 patent.

With the use of the program of FIG. 8, the scan slices 2-999 where maximum deviation between the marginal edges that are presented in the several orientations are identified. The article has an arbitrary length of 1000 scan slices that are oriented along the X axis. The article height is arbitrarily designated to be 400 along the Y axis. The thickness of the parts of the article is assumed to be 100 units as measured along the Y axis.

With continued reference to FIG. 8, the process is initialized by setting a first loop counter A to zero at step 202. At step 204, the counter is incremented and connected to the register where the orientation A data is stored. At steps 206 and 208, the leading edge and the trailing edge scan slices corresponding to X axis positions of 1 and 1000 in FIG. 9 are stored. This corresponds to scan slices 1 and 1000 assuming that a three-inch article will be sequentially scanned a thousand times as it passes the sensor 130 of FIG. 7. In this embodiment, scan slices 1 and 1000 are always stored. At step 210 in FIG. 8, orientation A stored information is retrieved.

At step 212, a second loop counter B is set to zero and incremented at step 214 to a position for an iteration with respect to orientation A data collected at step 210. Iteration compares learned data of orientation A with learned data of orientation A by starting with scan slice 2 of both orientation A and orientation A data. The number of differences in this pixel data at scan slice 2 for orientation A is determined and is called a score. The same procedure is followed for scan slices 3 through 999. In all, 998 scores are determined at step 216.

At step 218, the maximum score is determined should be zero. However some value less than 10 may be identified as maximum score and its scan slice number is stored as a window. While a reading from only one window is theoretically sufficient to determine that a part orientation does not match a stored known orientation, in practice several slice numbers, for example up to about 20, may be stored where the scores are the largest to reduce the likelihood of ambiguity in the results. This determination is made at step 226.

Orientation A data is then compared with orientation B data in the same manner and a new maximum difference at a new slice scan location is generated. This slice scan number is stored as a second window. Another signal on lead 224 increments loop counter B at step 214 to receive orientation C data after which the maximum difference slice scan number for a third window is generated. The loop counter B at step 214 continues incrementing until B is equal to the number of orientations stored.

At step 226, a determination is made as to whether a sufficient number of windows has been generated. If not, the same procedure is repeated. If "yes", the procedure advances to step 230 to determine whether counter A is equal to the total number of orientations that have been learned. In this example, stored information corresponding to orientations B, C and D will have been compared with all of the learned orientation data before this program is completed. At that time orientations A, B, C and D will each have been individually compared with stored orientation data for the same orientations A, B, C and D.

At the end of the setting-up procedure, at least 12 scan slice numbers will be identified as windows since each of the four article orientations will have three maximum differences which each produce three windows. Some of the windows appear at the same scan slice.

Turning to FIG. 9, windows are established by the program of FIG. 8 without operator selection at counts 99, 199, 799 and 899. These are the windows of importance for article orientation determination in the specific example here being described.

Once the windows have been identified, it has been found useful to expand each window to have a width of three or five scan slices centered about the scan slice. Thus, widening of a window compensates for possible data misalignments which can occur due to circuit delays and in some systems due to mechanical wear and other changes which occur during a continuous operation over several weeks.

After the windows are generated as a setting-up operation, work articles are fed past scanner 130 to identify edge points on the article profile. A comparison operates in real time to determine article orientation during an interval that corresponds to the interval between successive work articles on the conveyor.

When a work article is moved past sensor 130 of FIG. 7 which has an orientation A as shown in FIG. 9, a comparison of the work article profile data with each of the learned orientations A, B, C and D is made at the windows previously selected by the program of FIG. 8. Comparing the work article orientation A profile data with stored orientation A data gives a total score of zero. A similar comparison of the same work article data with the stored orientation B data gives a score of 300 at each of the four windows 99, 199, 799 and 899 to thereby produce a total score of 1200. The same comparison with the stored orientation C data gives a total score of 400 and with the orientation D data gives a total score of 1000.

From FIG. 9 it can be seen that regardless of which orientation the work article assumes, one stored orientation match with a score at or near zero will be obtained and the orientation of the work article thereby recognized. Where each window is three or five scan slices wide, the score for orientation mismatches increases while remaining essentially at zero for the actual orientation. The results obtained with a comparison of only four or up to about twenty windows along the length of a three-inch article can be accomplished with less memory and less time than where all scan slice information is processed while at the same time the performance is fully as reliable.

The present invention may be used with any suitable type of object or article feeder. To identify orientation and part size, the articles must appear before the scanner in single file because overlapping parts will be returned to the supply. FIG. 10 is a diagrammatic view of a vibratory bowl 301 that is a feeder type known per se, and which can be used in a high resolution parts or article handling system embodying the present invention. The vibratory bowl feeder 301 is shown to have a light source 302 and a high resolution camera sensor 303. A positional switch 305 and reorienting or diverting device 304 are located downstream of the camera sensor 303. A vision system controller 306 and overall system controller 307 are included.

Articles to be examined are placed in the center of bowl 301 and the vibratory motion of the feeder causes the articles to move along a path next to the bowl run rail in a singulated fashion to pass between the light source 302 and the sensor 303 in a known manner. An electronic image of the article is formed at the vision controller 306 where decisions are made relating to condition of article or its orientation. An appropriate control signal is sent to the re-orientor/diverter 304 at a time determined by switch 305.

FIG. 11 illustrates a further article conveyor which can be used with the high resolution article handling system according to the invention. In this embodiment, a slide 310 having an article inlet 309 and an article outlet 335 is utilized. Articles enter in a singulated condition at 309. The slope of the slide is selected so that the particles proceed down the chute under the influence of gravity to pass between the light source 311 and the camera sensor 315. An electronic image is created by breaking the light path between the light source in timed relation with the movement of the article down the chute 310. Article orientation is sensed, the information processed within the controller 340, and a signal is generated that will produce a proper response by reorientor/diverter 325. An improper article may be rejected at 330 or passed in a known orientation at 335.

While several embodiments have been illustrated, it is expected that other changes and modifications will be apparent to those skilled in this art. All such modifications and changes which fall within the scope of the claims and equivalents thereof are intended to be covered thereby.

We claim:

1. A high resolution handling systems for article orientation determined by geometric inspection and reorientation responsive to an output signal from a microprocessor, the high resolution handling system comprising:

means for conveying singulated work articles of like size and shape in a plurality of possible orientations along a path adjacent an article sensor responsive to article geometry;

said article sensor having at least 1000 pixels in a linear array that are oriented to be illuminated or shadowed depending on article geometry;

scanning means for producing an analog signal from said pixels during each scan period;

means responsive to article position as the article advances along said article conveying path for generating a master reset pulse that is used for initiating each scan at equidistant spacings even though conveyor speed may vary;

an analog to digital conversion means for producing digital data transitions at edge points of said article profile during each scan;

means for sensing data transitions for creating learned article geometry information data as part of a setting up procedure;

a memory for storing said learned article data;

means including a microprocessor for comparing learned article geometry information data from said memory with corresponding work article geometry information data in real time; said microprocessor including an automatic windowing system allowing an increased rate of processing by comparing fewer than all scans along the article length which comprises, means for generating a signal related to the article profile of a reference article in at least first and second different orientations as part of the setting up procedure, means for comparing said signals corresponding to different orientations to generate a scanned slice position signal at a scanned slice where the article edge points of corresponding scanned slices have a major difference that distinguishes the first orientation from the second orientation as part of the setting up procedure, means to identify and store said scanned slice position where said major difference exists as part of the setting up procedure, and means for determining in real time as part of the operating procedure the orientation of a work article on said conveyor which includes said means for generating a signal related to a work article profile, means for examining said work article profile signal at said identified scan slice portion and means responsive to a comparison of said examined signal and a signal previously stored at said identified scan slice position for producing an output signal that is used to control an article orienting means; and said article orienting means for orienting articles in response to an output signal from the comparing means.

2. A high resolution article handling system having means for interfacing with an article, said interfacing means responsive to an output signal from a microprocessor, the high resolution article handling system comprising:

means for conveying singulated articles along a path adjacent an article sensor;

said article sensor having at least 1000 pixels in a linear array, said article sensor pixels oriented to be selectively illuminated or shadowed depending on article geometry;

scanning means for creating a scan by producing an analog signal from said pixels during each scan;

means responsive to article position as the article advances along said article conveying path for generating a master reset pulse used for initiating each scan;

an analog-to-digital conversion means for producing digital data transitions at edge points of said article profile during each scan;

means for creating learned article data by sensing data transitions;

a memory for storing said learned article data;

means for creating article data by sensing data transitions;

means including a microprocessor for comparing learned article data from said memory with correspondent work article data in real time;

said microprocessor including an automatic windowing system allowing an increased rate of processing by comparing fewer than all scans along the article length which comprises means for comparing said learned article and said work article to generate a scanned slice position signal at a scanned slice where the article edge points of corresponding scanned slices have a major difference that distinguishes the learned article from the work article, means to identify and store said scanned slice positions where said major differences exist, and means for determining in real time as part of the operating procedure the conformance of a work article on said conveyor to said learned article data which includes said means for generating a signal related to a work article profile, means for examining said work article profile signal at said identified scan slices and means responsive to a comparison of said examined signal and a signal previously stored at said identified scan slice position for producing an output signal that is used to control said article diverting means; and means for mechanically interfacing with said work article in response to an output signal from the comparing means.

* * * * *